July 21, 1970 J. FABYAN 3,521,353
COMBINATION CUTTING TOOL
Filed Aug. 14, 1967 2 Sheets-Sheet 1
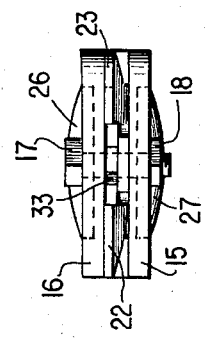
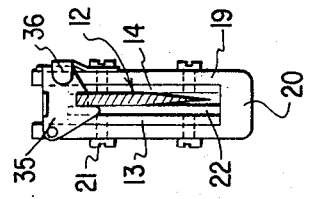
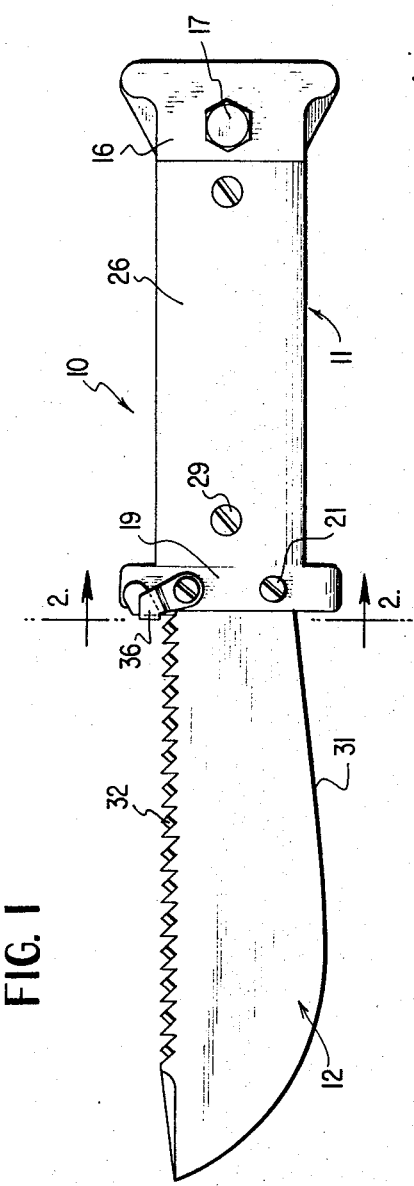
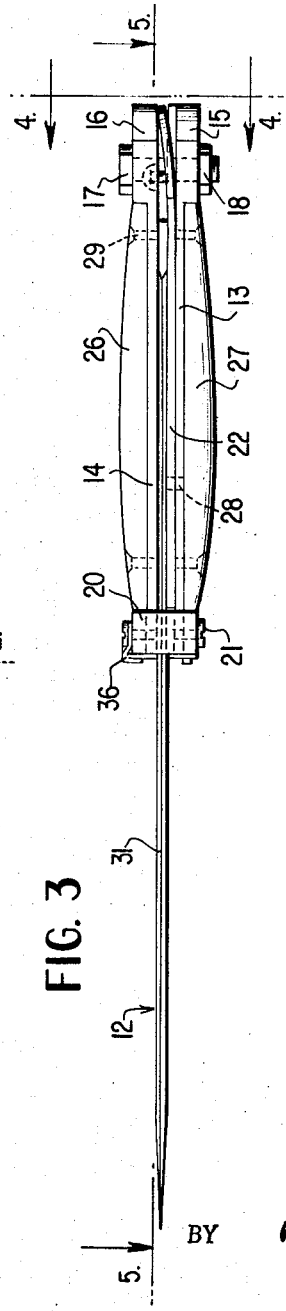
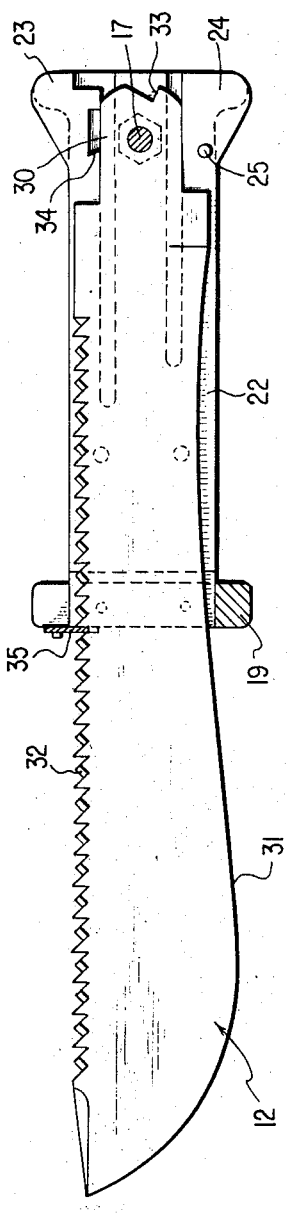
INVENTOR
JACK FABYAN
BY *Hennisan & Hennisan*
ATTORNEYS.

July 21, 1970   J. FABYAN   3,521,353
COMBINATION CUTTING TOOL
Filed Aug. 14, 1967   2 Sheets-Sheet 2
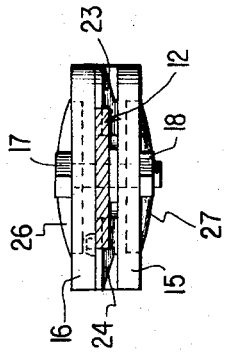
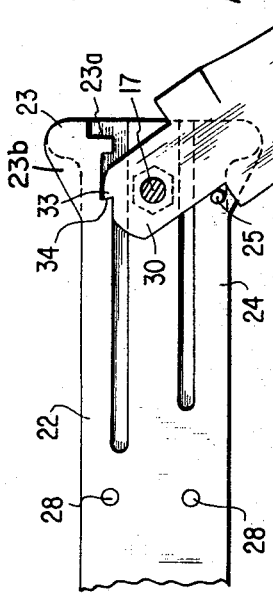
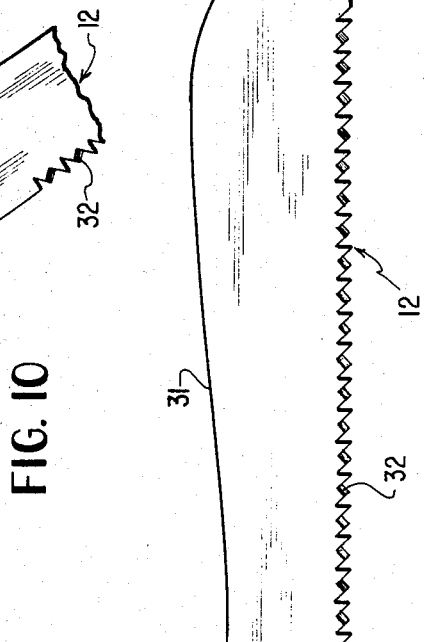
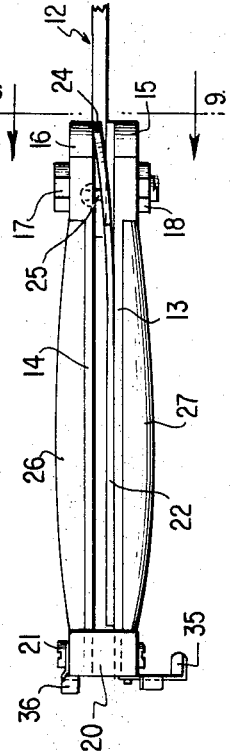
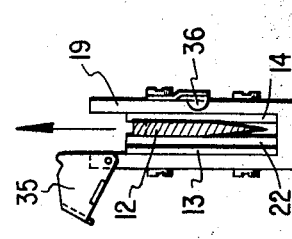
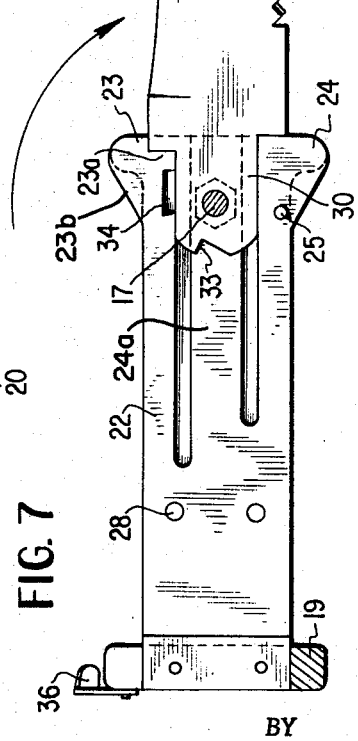
INVENTOR
JACK FABYAN
BY
ATTORNEYS.

United States Patent Office 3,521,353
Patented July 21, 1970

3,521,353
COMBINATION CUTTING TOOL
Jack Fabyan, Wasilla, Alaska 99687
Filed Aug. 14, 1967, Ser. No. 660,513
Int. Cl. B25f 3/00; B26b 1/00; B27b 21/00
U.S. Cl. 30—144        8 Claims

ABSTRACT OF THE DISCLOSURE

A cutting tool having a handle and pivotally mounted blade, which blade has a sharpened edge and a saw tooth edge. Spring biased lock means in the handle having two fingers permit blade movement into one of three positions whereby the tool is either a hunting knife, a machete, or a hand saw.

---

The present invention relates to new and useful improvements in cutting tools adapted for a combination of functions and more particularly, to a combination hunting knife, machete, and hand saw, all incorporated in a single housing and being adapted for selective use.

The hunting knife is a basic tool for most outdoorsmen and military troops and is frequently put into service for uses for which it was not intended. It has been found expeditious to use a hunting knife both as a saw and as a machete in order to obviate the necessity of carrying about rather large unwieldy separate tools each of which constitutes a burden on the sportsman or user and contributes to the gross weight which must be carried.

Previous attempts have been made to combine one or more conventional woodsman's tools into a single unit, however, few of these have met with any real success due to the inherent weaknesses in their construction and the fact that some sacrifice in the performance of each of the tools had to be made in order to make the combination.

The combination cutting tool described in detail herein fills all the requirements of each individual tool without sacrifice in the efficiency of any of the individual tool's operations.

It is an object of the present invention to provide a combination cutting tool serving the purposes of both a knife, a machete, and a handsaw.

It is a further object of this invention to provide a combination cutting tool wherein all of the components are contained in a single housing and wherein the tool may take on either the configuration of a handsaw, a machete, or a hunting knife with relatively simple manual manipulation.

Another object of the invention is to provide a combination cutting tool wherein a blade member is pivoted on a handle for movement between two positions, one of which forms a machete and the other of which forms a short bladed hunting knife.

Another object of this invention is to provide a pivoted blade knife construction having a locking device incorporated within the handle which limits blade movement even under severe forces applied to the blade.

Yet another object of the present invention is to provide a compact combination cutting tool including a handsaw and wherein the blade of the handsaw is located at an obtuse angle to the axis of the tool handle to facilitate use as a conventional saw.

Other objects of the invention are to provide a combination cutting tool, bearing the above objects in mind which is of durable construction, is at all times efficient, safe, and accurate in use, which is light in weight, and which has a minimum number of parts and is easy to manufacture and is relatively inexpensive.

For other objects and for a better understanding of the invention, reference may be had to the following detailed description taken in conjunction with the accompanying drawings in which:

FIG. 1 is a side elevation of the combination cutting tool in its hunting knife configuration;

FIG. 2 is a transverse sectional view through the knife blade in the direction of 2—2 in FIG. 1;

FIG. 3 is a bottom view of the combination tool in its hunting knife configuration;

FIG. 4 is an end elevation taken in the direction of the arrows 4—4 in FIG. 3;

FIG. 5 is a longitudinal section through the handle portion of the knife along the lines 5—5 in FIG. 3;

FIG. 6 is a transverse sectional view similar to FIG. 2, but showing the latch in its raised or open position;

FIG. 7 is a longitudinal sectional view similar to FIG. 5, but showing the blade swung and locked into its machete configuration;

FIG. 8 is a partial bottom view of the handle member similar to FIG. 3, but showing the combination in its machete configuration;

FIG. 9 is a sectional view taken along lines 9—9 of FIG. 8; and

FIG. 10 is a partial longitudinal section similar to FIGS. 5 and 7, but showing the knife blade locked in its handsaw configuration.

Reference is now made more specifically to the drawings wherein like numerals designate similar parts throughout the several views and wherein the combination cutting tool of the present invention is designated generally at 10.

Knife 10 comprises two sections, the handle portion 11 and the blade portion 12. Handle 11 is preferably formed from two metal side plates 13 and 14 which serve as the main structural support for the knife assembly. Each side plate terminates at its end in a hilt plate 15 and 16 respectively, as seen in FIGS. 1, 3 and 4. The hilt plates serve several functions including that of a limit stop when the knife is placed in a scabbard wherein the hilt plates will abut against the top of the scabbard opening. The plates also serve to confine the hand of the user about the handle portion. The hilt plates may be formed integral with the side plates 13 and 14 as shown, or in the alternative, may be a separate member secured thereto.

A headed pivot bolt 17 passes through both of the hilt plates of the side plate members and is secured thereto by nut 18. The pivot bolt serves as the point of attachment of the blade member 12 to the handle 11 and enables pivotal motion of the blade for selective positioning either as a hunting knife, machete, or handsaw.

The opposite ends of the side plates are joined by a U-shaped hilt 19 having a flat bottom portion 20. The U-shaped hilt is secured to the side plates by screws 21. It will be noted that the flat bottom portion of the U-shaped hilt serves to prevent rotation of the blade 12 about the pivot bolt 17 in one direction; rotation in the other direction being selectively prevented by means of a latch device later described. The flat bottom portion 20 of the U-shaped hilt serves the additional function of a striking surface and may be used as a light duty hammer, if desired.

In order to insure that the blade member 12 remains rigid in its various positions of use and will not slip or pivot about pin 17 when not desired, a locking device is provided. A leaf-spring locking plate 22 of the same general size and configuration as the metal side plates 13 and 14 is interposed between the side plates as best seen in FIGS. 2, 3, 4 and 5 and is secured to side plate 13 by screws 28. The locking plate is bifurcated as shown to provide three parallel spaced portions or fingers 23, 24, and 24a. A locking detent arm 23 forms one of the portions and is cut out to provide a recessed shoulder 23a which serves as an abutment to retain the knife blade into position as a machete as seen in FIG. 7. The outwardly flared portion of the detent arm 23 defines a thumb tab 23b which, due to the resiliency of the locking plate, may be moved from one size to the other against the normal bias of the arm as shown in FIG. 8. As can be seen from FIGS. 3 and 8, the detent arm in its normal position is biased so as to block pivotal movement of the knife blade 12. Due to the offset position of the locking plate 22 with respect to the longitudinal axis of the blade, manual movement of the locking plate or the detent arm portion thereof will allow the knife blade clearance for pivotal movement into converted position as later described.

The leaf-spring locking plate 22 includes a central finger 24a and a second detent arm 24 on the opposite side which is similar in its operation and general construction to the detent arm 23 with the exception of the cut-away portion 23a. The end face of detent arm 24 serves as the abutment for the knife blade. A saw limit stop pin 25 extends from the side of the detent arm 24 and is spaced inwardly from the end edge as shown in FIG. 7. When the knife combination is desired to be used as a handsaw, the detent arm 24 is manually offset to allow the knife member to swing into the position shown in FIG. 10 wherein the shank portion of the blade 30 abuts against the pin 25 and is held securely therein. When this position is reached a detent 33 formed at the base of the shank will lock with a saw lock pawl or projection 34 which is formed on the locking detent arm 23. In this position the saw configuration is held against movement in either direction by cooperation of the shank with both the limit stop pin 25 and the pawl 34.

As can be seen best from FIG. 7, the knife blade 12 is ground sharply on one edge to define a cutting portion 31. The opposite side of the blade is provided with cross cut saw teeth 32.

A pair of plastic or bone hand grips 26 and 27 are secured to the outer sides of the metal side plates 13 and 14 by screws 29.

When the knife assembly is swung to define a hunting knife as shown in FIG. 1, the top portion of the U-shaped hilt is closed off by means of the swinging latch arm 35 shown in FIGS. 2 and 6. A recess in the latch arm will engage between teeth 32 of the saw side of the blade. The safety latch 35 is retained in position by a latch closure 36 pivoted to the hilt 19 as seen in FIGS. 1 and 2.

What I claim as my invention, and desire to protect by Letters Patent of the United States is:

1. A combination cutting tool comprising a pair of side plates, a blade member having a length longer than said side plates, one edge of said blade member being sharpened and the other edge of said blade being provided with saw teeth, a narrow shank formed at the end of said blade member, a pivot pin pivotally securing said shank between said side plates adjacent one end of said side plates, blade lock means between said side plates adapted to lock said blade member in a position wherein the major portion of its length is outside of said side plates, defining a machete, said blade member being pivotable in one direction when said lock means is unlocked to a position between said side plates wherein a shorter portion of its length is outside of said side plates to define a hunting knife, said lock means being provided with a releasable portion which when opened allows pivotal blade movement in the opposite direction, a limit stop on said lock releasable portion, and cooperating pawl and detent means between said side plates to lock said blade member in position against said limit stop to define a hand saw.

2. A cutting tool as defined in claim 1 wherein said lock means comprises a leaf-spring locking plate having a central finger through which said pivot bolt passes and two spaced leaf-spring lock fingers, one on each side of and parallel to said central finger, each lock finger normally serving to block movement of said blade in one direction of pivotal movement, and each lock finger adapted to be temporarily displaced against its normal bias to permit pivotal blade movement.

3. A cutting tool as defined in claim 1 and further including a retaining safety latch to prevent pivotal blade movement when said blade is in its hunting knife configuration.

4. A combination hunting knife, machete, and hand saw comprising:
 (a) a pair of parallel side plates each terminating at one end in a hilt plate,
 (b) a U-shaped hilt having one leg thereof connected to each of the opposite ends of said side plates,
 (c) a leaf-spring locking plate secured between said side plates and having two spaced leaf-spring lock fingers extending toward said one end of said side plates,
 (d) a blade member having a length longer than said side plates and having a narrow shank formed at one end thereof,
 (e) a pivot bolt passing through and between said side plates and said blade shank adjacent to said one end of said side plates, whereby said blade is pivotally mounted for movement between said side plates,
 (f) said leaf-spring lock fingers in their normal position interfering with and blocking movement of said blade member wherein said knife is in a machete configuration,
 (g) a finger tab on one of said lock fingers for temporarily displacing said lock finger to allow said blade member to pivot to a position approximately 180 degrees removed from its normal position wherein a portion of said blade member is disposed within and along the length of said side plates and a short portion thereof extends beyond said other end to define a hunting knife.

5. A combination hunting knife, machete and hand saw as defined in claim 4 wherein said blade member has one sharpened edge and the other edge formed with a plurality of saw teeth, and further including,
 (h) a finger tab on the other of said lock fingers for temporarily displacing said lock finger to allow said blade member to move therepast,
 (i) a limit stop pin on said other lock finger spaced inwardly from the end of the lock finger to engage the shank of said blade member,
 (j) a detent on the end of said shank, and
 (k) a lock projection on said one lock finger engageable with said detent when the blade member is pivoted so that its shank is in contact with said stop pin, whereby said blade member is locked against pivotal movement and defines a hand saw.

6. A combination hunting knife, machete, and hand saw as defined in claim 4 and further including,
 (h) a retaining safety latch to prevent pivotal blade movement when said blade is in its hunting knife configuration.

7. A combination hunting knife, machete, and hand saw as defined in claim 4 and further including,
 (h) a central finger extending between and parallel to said leaf-spring lock fingers, said pivot bolt passing therethrough.

8. A combination hunting knife, machete, and hand saw as defined in claim 4 and further including, (h) hand grips secured to the outer face of each of said side plates.

References Cited

UNITED STATES PATENTS

| | | | |
|---|---|---|---|
| 530,913 | 12/1894 | Cook | 30—162 |
| 1,056,081 | 3/1913 | Yerzley | 30—155 |
| 1,277,290 | 8/1918 | Campbell | 7—16 |
| 1,645,101 | 10/1927 | Gibb et al. | 30—155 X |
| 2,305,476 | 12/1942 | Johnson | 30—144 |

FOREIGN PATENTS

| | | |
|---|---|---|
| 23,005 | 12/1892 | Great Britain. |
| 358 | 6/1886 | Sweden. |

ROBERT C. RIORDON, Primary Examiner

J. C. PETERS, Assistant Examiner

U.S. Cl. X.R.

30—321; 145—108